W. G. BETZ.
REWINDING DEVICE FOR PNEUMATIC PIANOS.
APPLICATION FILED JUNE 12, 1911.
1,015,128.
Patented Jan. 16, 1912.
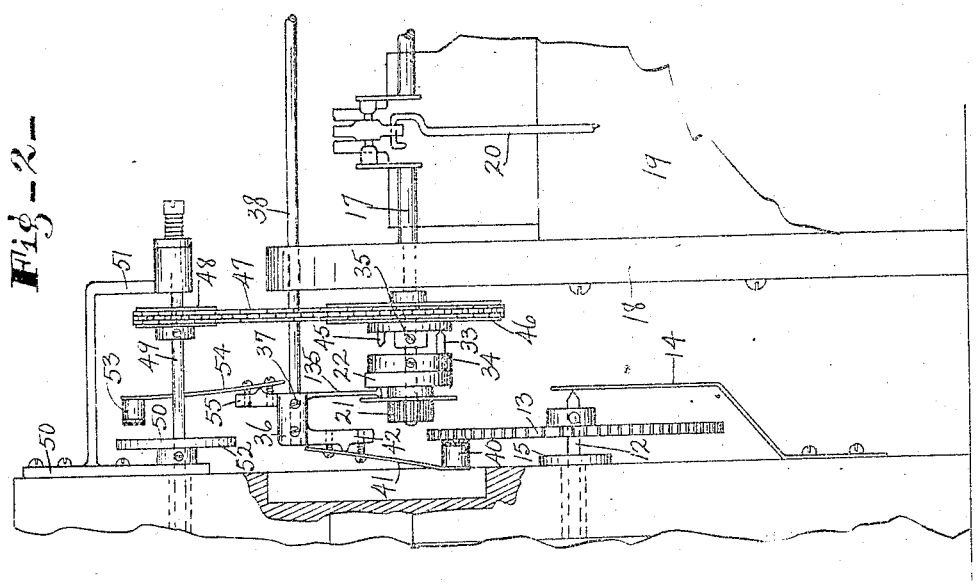
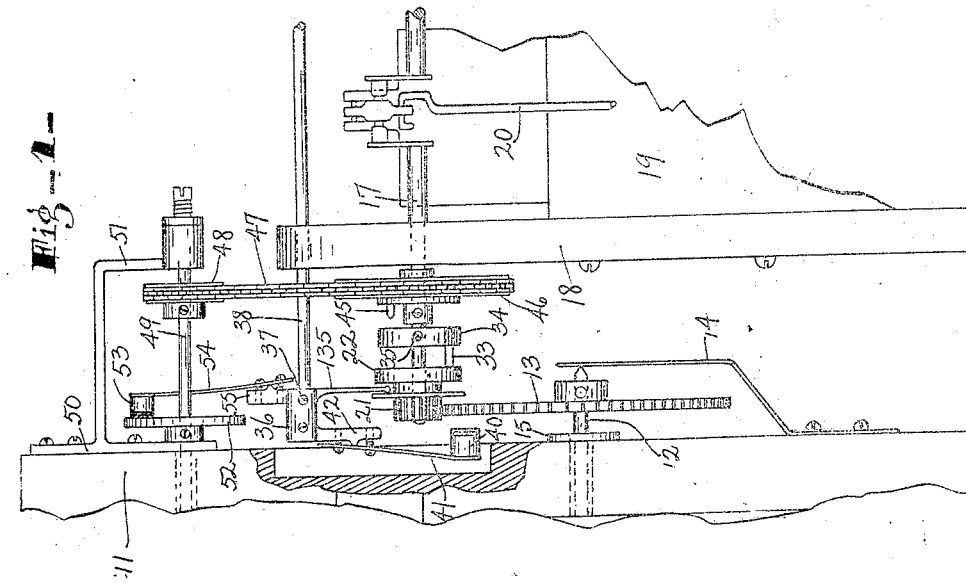
WITNESSES:
INVENTOR.
William G. Betz.
BY
ATTORNEY.

UNITED STATES PATENT OFFICE.

WILLIAM G. BETZ, OF CHICAGO HEIGHTS, ILLINOIS, ASSIGNOR TO STEGER & SONS PIANO MANUFACTURING COMPANY, OF CHICAGO, ILLINOIS, A CORPORATION.

REWINDING DEVICE FOR PNEUMATIC PIANOS.

1,015,128. Specification of Letters Patent. Patented Jan. 16, 1912.

Application filed June 12, 1911. Serial No. 632,584.

*To all whom it may concern:*

Be it known that I, WILLIAM G. BETZ, a citizen of the United States, and a resident of Chicago Heights, county of Cook, and State of Illinois, have invented a certain useful Rewinding Device for Pneumatic Pianos; and I do hereby declare that the following is a full, clear, and exact description thereof, reference being had to the accompanying drawings.

The object of this invention is to provide a satisfactory mechanism for the take-up spool and rewinding means in a pneumatic piano at the same time alternately braking said take-up spool and rewinding means and also to provide a single means for throwing said take-up spool and rewinding means alternately into and out of operation and actuating the brakes. This will cause the music sheet to be held under tension so that it will pass smoothly and evenly over the tracker bar and it will also cause the music sheet to be rolled evenly.

The nature of the invention will be understood from the accompanying drawings and the following description and claim.

In the drawings Figure 1 is a front elevation of the piano showing said mechanism in condition to drive the take-up spool and operate the brake for the rewind. Fig. 2 is a part of Fig. 1 showing the mechanism changed so as to stop the take-up means and drive the rewind.

In detail there is shown herein a bar 11 which is part of the frame in which there is mounted the shaft 12 of the take-up spool on which the spool gear 13 is secured.

14 is a spring to move the take-up spool shaft into place, said shaft having a collar 15 which bears against the side of the frame.

A motor shaft 17 is mounted in a bracket 18 secured to a motor block 19 and the shaft is driven by the usual connecting pedal rods 20. A pinion 21 is slidably mounted on said shaft 17 in position to mesh with and drive the spool gear 13. The pinion 21 has a collar 22 secured to it from which a pin 33 projects loosely through a collar 34 secured on the shaft 17 by a screw 35. The pinion and collar 22 are, therefore, slidable on the shaft and their rotation is caused by the collar 34 and pin 33. The collar 22 is moved on the shaft by an arm 135 secured to a frame 36 which by screws 37 is secured on a rod 38 laterally slidable in the bracket 18 by any suitable means, not shown. When the rod 38 is moved to the right, from the position shown in Fig. 1 to that shown in Fig. 2, the pinion 21 will be disengaged from the driven wheel 13 on the spool shaft 12. At the same time the spool will be stopped by a brake block 40 being moved thereby into engagement with said gear 13, as shown in Fig. 2. This brake block 40 is on a spring 41 which is secured to a frame 42 from the frame 36 in such position that when the pinion 21 is moved out of engagement with the gear 13 the brake will be moved into engagement with said gear and when the pinion 21 is moved into engagement with the gear 13 the brake 40 will be moved away from the gear. When the rod 38 is moved to the right, to the position shown in Fig. 2, in order to stop the take-up spool shaft the pin 33 will have been moved into the path of the pin 45 projecting from the hub of a sprocket wheel 46 also loosely mounted on the motor shaft 17 and that will cause the actuation of said sprocket wheel 46. A chain 47 connects said wheel with a sprocket wheel 48 secured on the rewind shaft 49 which extends through a plate 50 secured on the side of said frame and the outer end of an arm 51 from said plate. There is a disk 52 secured on the shaft 49 and a brake block 53 is mounted on a spring 54 which is secured to an arm 55 extending up from the frame 36 in such position that when the rod 38 is in the position shown in Fig. 1, the brake 53 will engage the rewind disk 52 and stop the rewind mechanism. But when the rod 38 is moved to the right, to the position shown in Fig. 2, it will disengage the brake 53 from the disk 52 and at the same time throw the motor shaft 17 into driving gear with the rewind shaft 49.

I claim as my invention:

In a pneumatic piano, the combination with a take-up spool shaft, a gear secured thereon, a motor shaft, a sliding pinion mounted loosely thereon so as to be moved into and out of mesh with said gear, a rewind shaft, a brake disk thereon, a sprocket wheel loosely mounted on the motor shaft for driving the rewind shaft, a collar secured on the motor shaft, a pin extending from the pinion thereon that operates in and is slidable through the said collar, a pin on the sprocket wheel of the motor shaft in position to engage the pin extending from the pinion when the latter is moved out of engagement with the gear on the take-up roll shaft, a longitudinally slidable rod having a frame thereon, an arm extending from the frame in position to stop said pinion on said motor shaft, a brake mechanism extending from said frame in position to engage the brake disk on the rewind shaft when said pinion is in mesh with the gear on the take-up roll shaft, and a brake extending from said frame in position to engage the gear on the take-up roll shaft when the pinion is moved out of engagement therewith, substantially as set forth.

In witness whereof, I have hereunto affixed my signature in the presence of the witnesses herein named.

WILLIAM G. BETZ.

Witnesses:
ESTHER AKERJELM,
BLANCHE HAYES.